Patented Sept. 4, 1934

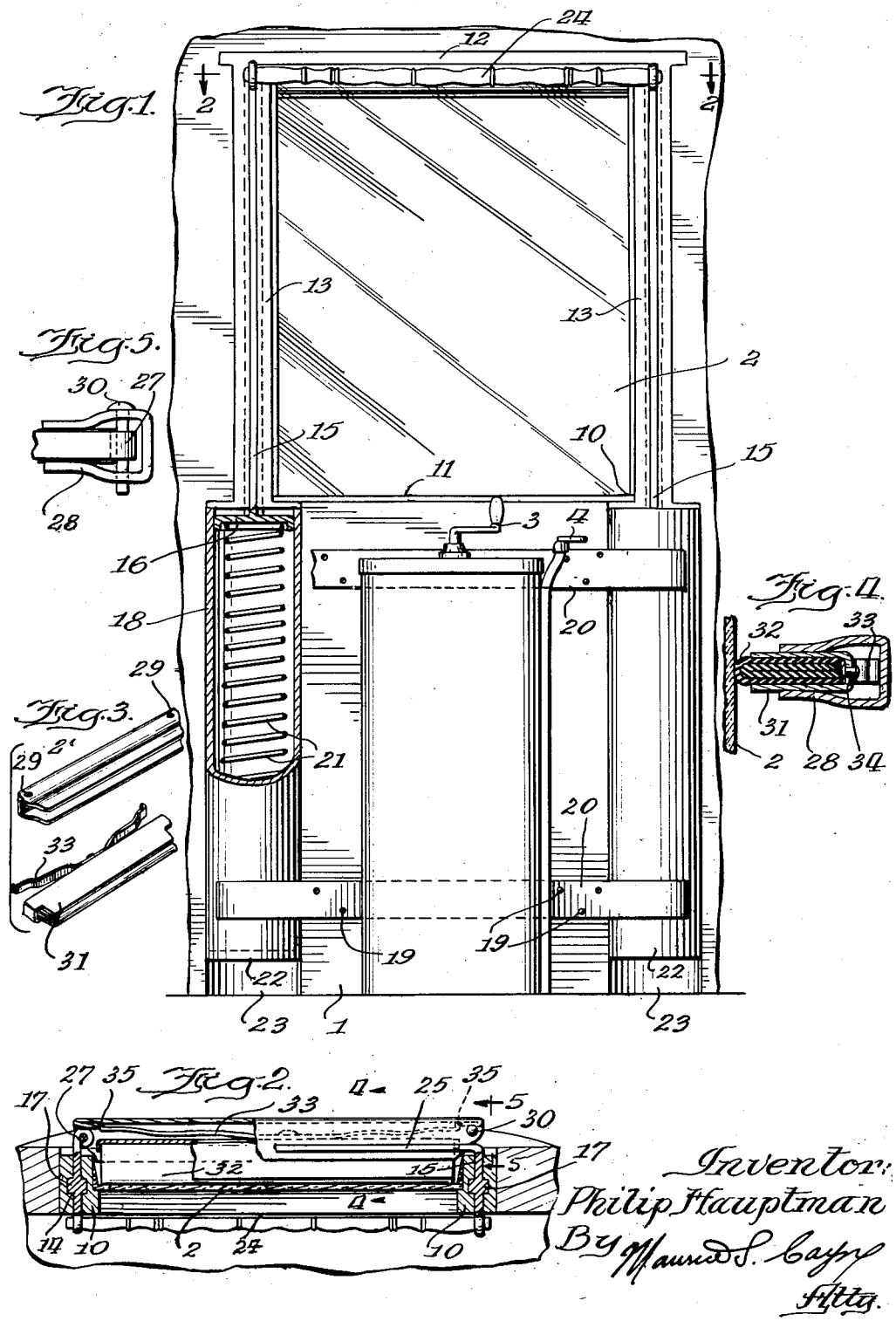

1,972,299

UNITED STATES PATENT OFFICE 1,972,299

WINDSHIELD CLEANING DEVICE

Philip Hauptman, Chicago, Ill.

Application February 4, 1933, Serial No. 655,179

4 Claims. (Cl. 15—251)

This invention relates to a novel and improved wind shield cleaning device, and more particularly to a cleaning device of the non-automatic type whereby the same is inoperative except by the manual actuation of the operator.

In practically all of the wind shield cleaners heretofore used the same are power operated and are so disposed as to oscillate in front of the operator to clean that portion of the wind shield directly in the operator's line of vision. The constant oscillation of the cleaner to a large extent interferes with the clear vision of the operator, and this interference with the operator's vision is at a time when a clear vision is mostly needed. In addition to the above disadvantages there is also the added disadvantage of the devices heretofore used getting out of order by reason of the relatively delicate mechanism required for the successful operation of the same.

It is, therefore, the main object of this invention to provide a wind shield cleaning device which will overcome the above disadvantages, but which will at the same time be highly efficient for cleaning or clearing the wind shield whenever found necessary or desirable with a minimum of effort and attention on the part of the operator.

Another object of this invention is to provide a wind shield cleaning device which is normally disposed away from the line of vision of the operator, but which may be manually moved across the wind shield to clean the same, the device having spring means associated therewith for automatically returning the same to its original position.

A further object of this invention is to provide a wind shield cleaning device of the character described having spring means associated therewith for normally holding it in a position away from the line of vision of the operator, and means for manually actuating the same to move it across the wind shield for cleaning the same against the action of said spring means.

A still further object of this invention is to provide a wind shield cleaning device of the character described adapted for normal position away from the line of vision of the operator, spring means for holding it in said normal position, and means whereby the same may be manually actuated against the action of said spring means for moving the device across the wind shield for cleaning the same.

A still further object of this invention is to provide a wind shield cleaning device of the character described having a wiper bar extending transversely across the wind shield and a spring pressed assembled wiper carried by said wiper bar.

A still further object of this invention is to provide a wind shield cleaning device of the character described having spring means for normally holding it in one position away from the line of vision of the operator, a wiper bar detachably associated with said device and having a spring pressed assembled wiper associated therewith whereby the wiper will be held in yielding engagement with the surface of the glass for efficiently cleaning the same when moved across the wind shield.

A still further object of this invention is to provide a device of the character described including a detachable wiper bar having an assembled wiper associated therewith and spring means for holding said wiper in yielding engagement with the surface of the glass.

A still further object of this invention is to provide a wind shield cleaning device of the character described which will be simple in construction, assembly and operation, which may be produced along lines convenient for low cost manufacture, and which will be highly efficient for carrying out the purpose for which it is designed.

With the foregoing and other objects in view, which will appear as the description proceeds, the invention consists in certain novel features of construction, arrangement and combination of parts, hereinafter more fully described and illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawing a preferred embodiment thereof from an inspection of which, when considered in connection with the following description, my invention, its mode of construction, assembly and operation, and many of its advantages should be readily understood and appreciated.

Referring to the drawing in which the same character references are employed to indicate corresponding or similar parts throughout the several figures of the drawing:

Figure 1 is a front elevational view of a front window of a street car with my improved cleaning device mounted thereon;

Fig. 2 is a sectional view taken on line 2—2 of Fig. 1;

Fig. 3 is an exploded view in perspective showing my improved wiper bar and holder therefor;

Fig. 4 is a sectional view through the wiper bar assembly taken on line 4—4 of Fig. 2;

Fig. 5 is an end elevational view taken on line 5—5 of Fig. 2.

Referring to the drawing more specifically by characters of reference, the numeral 1 designates the front wall of a street car or the like, said wall having mounted therein the window 2 and the operating mechanisms 3 and 4 for controlling the operation of the car.

In the embodiment illustrated in the drawing, the window pane 2 may be mounted in a suitable metal frame 10 securely housed within the front wall 1 of the car. The metal frame 10 comprises the bottom member 11, a top member 12 and side members 13. Each of the side members is provided with a vertical passage 14, said passage being closed at its upper end and open at its lower end and is adapted to receive for sliding movement therein a member 15, to the lower end of which member is rigidly secured a circular disk 16. Each of the members 15 are provided with enlarged portions along their full length thereof as shown at 17, said enlarged portions being received in similarly shaped recesses provided therefor in the side members 13 of the frame 10. The disposition of the enlarged portions 17 within their respective recesses will ensure a proper alignment of said sliding members 15 in their vertical movement within their respective side members 13. In addition to ensuring proper sliding movement of said members 15, the provision of the enlarged portion 17 will also prevent the ingress of rain, wind, etc., by reason of its forming sort of a seal between the front and rear sides of the frame 10.

The circular disks 16 secured to the members 15 are adapted to be received in suitable cylinders 18 mounted directly below the frame 10 and detachably secured by means of the screws 19, or any other suitable means, to the wall 1 of the car. Said cylinders have rigidly secured thereto suitable cross member 20, which members connect the two cylinders shown in the drawing to each other, and by means of which members the said cylinders are rigidly secured in place on the front wall of the car and in position to receive the circular disks 16.

Disposed within each of said cylinders is a spiral spring 21, which spring is disposed so as to normally act against the under side of said disks 16 to hold the said members 15 in their uppermost position, as shown in Fig. 1 of the drawing. The bottom ends 22 of each of said cylinders is disposed in spaced relation to the floor of the car to provide a space 23, which space will permit the lowering of said cylinders when the screws 19 have been removed to a position where the disk 16 will be disposed above the upper edge of the said cylinders thereby permitting the removal of said cylinder for the purpose of changing the spring therein or making any other adjustment that may be necessary or desirable.

The members 15 are disposed so as to extend completely through the side members 13 of the frame, said members being connected to each other adjacent their upper ends on the inner side of the window by means of the cross member 24, which member may form the operating handle for the device. On the outer side of the window frame the said members 15 are rigidly connected to each other by means of a cross rod 25. In practice it may not be necessary to provide this cross rod 25 as the rod 24 extending between the two members 15 and connecting the same may be sufficient for holding the same in the proper operative position.

Provided on the outer face of the window frame on each of the members 15 is an eye 27 by means of which the wiper rod assembly, to be presently described, may be detachably secured in operative position. In the embodiment illustrated, and particularly shown in Figs. 2 and 5, the wiper bar assembly comprises a member 28 of substantially U-shaped cross section, the free ends of which are adapted to be received over the eyes 27. Adjacent each end of said member 28 are provided suitable openings 29 which openings are adapted for alignment with the openings through the eyes 27 there being disposed a suitable fastening means, such as a cotter pin 30 or the like, within said openings whereby the member 28 may be rigidly secured in place on the sliding members 15.

The wiper bar shown in Fig. 3 is generally designated by the reference character 31 and is adapted for disposition within the member 28. The said wiper bar 31 is also of substantially U-shaped cross section and is adapted for receiving therein the wiper 32 which may be of any suitable material such as rubber, or the like, said wiper 32 being held in place in the wiper bar 31 by the spring tension of the side walls of said wiper bar.

Secured to the rear edge of the wiper bar 31 is a suitable spring member 33, which member is secured intermediate its ends by means of a suitable rivet, as shown at 34 in Fig. 4. The provision of the spring 33 will ensure a constant yielding engagement between the wiper 32 and the glass or window pane 2.

As shown in Fig. 2 of the drawing, the member 28 is provided adjacent each end with a suitable shoulder 35 against which the free ends of the spring 33 are adapted to be disposed when the wiper bar is in assembled position within the member 28.

From the above arrangement it will be apparent that by reason of the action of the springs 21 on the disks 16 the cleaning device will be normally held in the position shown in Fig. 1, in which position the same will not in any way interfere with the clear vision of the operator of the vehicle. However, whenever found necessary or desirable to clean the outer surface of the window pane 2 the cleaning device may be actuated by pulling on the member 24, which action will cause the wiper 32 to move vertically to clean the outer surface of the window, and when the said rod 24 is released by the operator the action of the springs 21 will immediately return the same to the position shown in Fig. 1 of the drawing. Thus only a slight movement downwardly will be effective for completely cleaning the window pane without any further attention on the part of the operator.

By reason of the assembly illustrated in the drawing it will be apparent that the wiper 32 may be readily removed and a new wiper inserted in its place with a minimum of effort and time. The arrangement is such that the parts which are mostly liable to require change from time to time are readily removable. Thus the removal of the cotter pins 30 will permit the removal of the wiper bar 31 in order to change the wiper therein or to change the tension of the spring 33 in order to obtain a proper yielding engagement between the wiper 32 and the window pane 2.

The operation of the device should be readily understood from the foregoing, and it should be apparent that by reason of the small number of parts required in the assembly and operation of the device the danger of the same getting out of order is practically eliminated, thereby ensuring an operating device practically at all times. Also by reason of the improved construction, the device will at all times, except when actually moved to operating position, be disposed so as to be completely out of or away from the line of vision of the operator.

Although the device as illustrated in the drawing is shown mounted on a front window of a street car, it is to be understood that I do not limit myself to that particular use only as the same may be equally useful and efficient in operation on the wind shield of a motor vehicle or any other place where a device of this character may be necessary for cleaning or clearing the outer surface of a wind shield, lookout window, or the like.

It is believed that my invention, mode of construction and assembly and operation, and many of its advantages, should be readily understood from the foregoing without further description, and should also be manifest that while a preferred embodiment of the invention has been shown and described for illustrative purposes, the structural details are, nevertheless, capable of wide variation within the purview of my invention as defined in the appended claims.

What I claim and desire to secure by Letters Patent of the United States is:

1. The combination in a window cleaning device, of a window frame having vertical passages provided at opposite sides of the sash thereof, vertically movable vertical rods disposed within said passages, said passages extending through the entire depth of said window frame and being of enlarged cross section intermediate their ends to form longitudinal recesses, said rods being provided with enlarged portions for reception within said recesses for guiding said rods in their vertical movement, a bracket connected to said rods, a cleaning strip connected to said bracket, a spring interposed between said bracket and cleaning strip tending to retain said strip in operative relation with the outside of the window pane, the lower ends of said rods being of enlarged cross-sectional area and received in vertically disposed cylinders, and spring means mounted in said cylinders between the lower ends of said rods and the bottom walls of said cylinders for urging said rods to their uppermost position.

2. The combination in a window cleaning device of a window frame having vertical passages provided at opposite sides of the sash thereof, said passages extending through the entire depth of said frame and being of enlarged cross section intermediate their ends forming longitudinal recesses, vertically movable vertical rods mounted within said passages and having longitudinal guide ribs formed thereon for reception within the longitudinal recesses to guide said rods in their vertical movement, the lower ends of said rods being of enlarged cross-sectional area and received in vertically disposed cylinders, spring means mounted in said cylinders between said lower ends of said rods and the bottom walls of said cylinders for urging said rods to their uppermost position, a transverse member connected to said vertically movable rods, said transverse member being disposed on the outside of the window frame, a cleaning strip connected to said transverse member, a spring interposed between said transverse member and said cleaning strip tending to retain said cleaning strip in operative relation with the outside of the window pane, and a second transverse member connected to said rods and disposed on the inside of said window frame for effecting the downward movement of the cleaning strip from the inside of the window.

3. The combination in a window cleaning device, of a window frame having vertical passages provided at opposite sides of the sash thereof, said passages extending through the entire depth of said window frame, vertically movable vertical rods mounted within said passages, a transversely disposed wiper bar connecting said movable rods adjacent their upper ends, a cleaning strip carried by said wiper bar and extending across the outer surface of the window pane, means for holding said rods in a position where the wiper bar will be completely away from the line of vision through the window pane, said last mentioned means including a pair of cylinders mounted below the window pane and having spring means disposed therein for engagement with the lower edges of the movable rods and the bottom walls of said cylinders for forcing the former to their uppermost position, and a transverse member connecting said rods on the inside of the window frame for effecting the downward movement of the said movable rods against the action of the said spring means.

4. In combination with a wind shield of a street car or the like, of a casing within which the window pane is mounted, said casing having vertical passages provided at opposite sides of the sash thereof, vertically movable vertical members arranged in each of said passages, a transversely disposed bracket connected adjacent the upper ends of said members, a cleaning strip carried by said bracket and means for yieldingly retaining said cleaning strip in operative relation with the outside surface of the window pane, said means ncluding a spring interposed between said bracket and said cleaning strip, the lowermost edges of said vertical members being of enlarged cross section, a pair of vertically disposed cylinders arranged directly below said vertical members and in position to receive in their upper portions the enlarged portions of said vertical members, spring means disposed within said cylinders and engaging the lower portions of said vertical members and bottom walls of said cylinder for normally forcing the former to their uppermost position, in which position the cleaning strip will be completely away from the line of vision through the window pane, and a transverse bar connected to said vertical members on the inside of the window frame for effecting the downward movement of the cleaning strip from the inside of the window.

PHILIP HAUPTMAN.